July 11, 1950
R. E. KITTREDGE
2,514,770
COMPUTER FOR GROUNDED AVIATION TRAINERS FOR
CONVERTING INDICATED AIR SPEED TO TRUE
AIR SPEED AND VICE VERSA
Filed Oct. 29, 1947
2 Sheets-Sheet 1
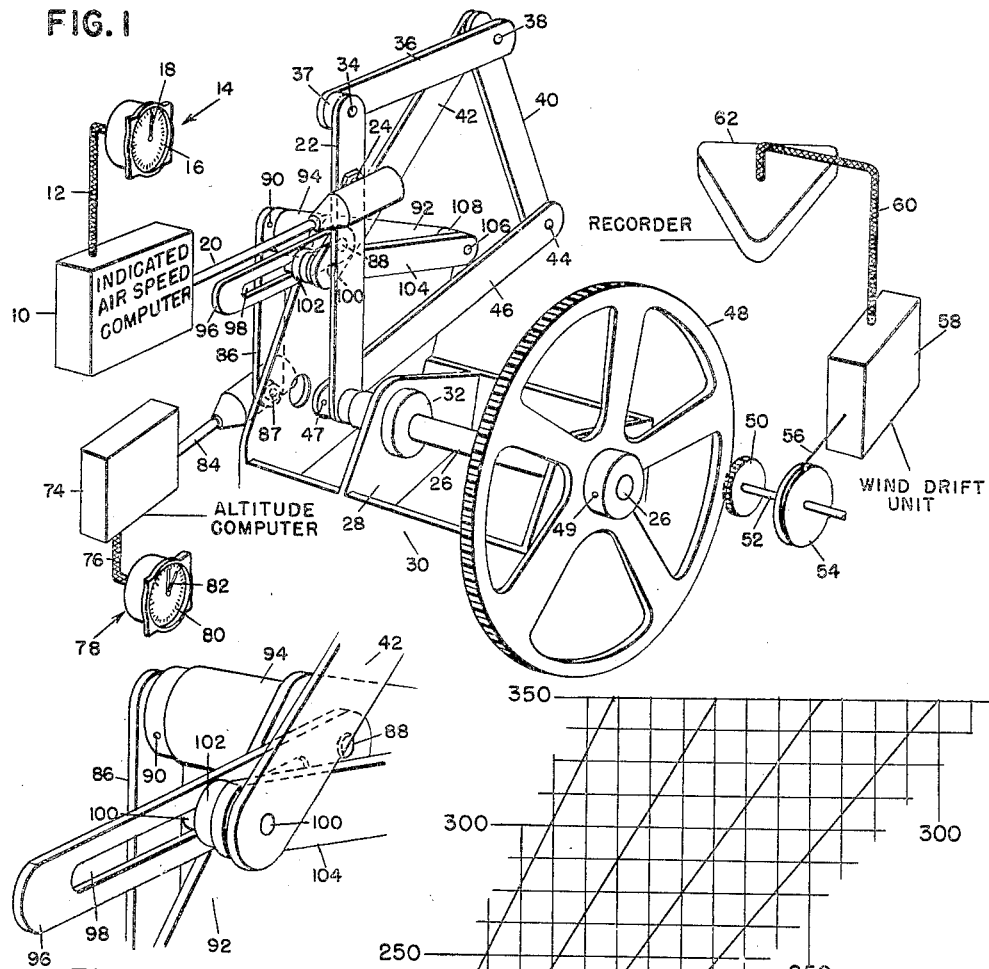
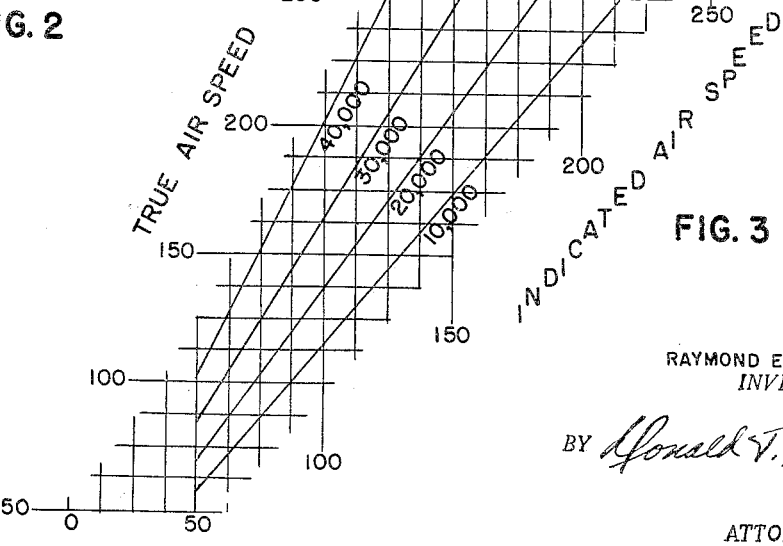
RAYMOND E. KITTREDGE
*INVENTOR.*
BY Donald T. Hillier
*ATTORNEY*

July 11, 1950

R. E. KITTREDGE 2,514,770

COMPUTER FOR GROUNDED AVIATION TRAINERS FOR
CONVERTING INDICATED AIR SPEED TO TRUE
AIR SPEED AND VICE VERSA

Filed Oct. 29, 1947

RAYMOND E.
KITTREDGE
INVENTOR

BY Donald T. Heller

ATTORNEY

Patented July 11, 1950

2,514,770

UNITED STATES PATENT OFFICE 2,514,770

COMPUTER FOR GROUNDED AVIATION TRAINERS FOR CONVERTING INDICATED AIR SPEED TO TRUE AIR SPEED AND VICE VERSA

Raymond E. Kittredge, Port Dickinson, N. Y., assignor to Link Aviation, Inc., Binghamton, N. Y., a corporation of New York Application October 29, 1947, Serial No. 782,846

3 Claims. (Cl. 235—61)

This invention relates to a computer for use in grounded aviation trainers for converting indicated air speed to true air speed, and vice versa.

In the case of an airplane in actual flight, the air speed indicator carried upon the instrument panel of the plane indicates what is commonly referred to as the indicated air speed of the plane. The true air speed of the plane, i. e., the actual speed of the plane relative to the mass of air through which it is flying, differs from the indicated air speed when the air through which the plane is flying is other than of standard density. This is because the air speed indicator upon the instrument panel is calibrated to indicate the true air speed of the plane only when the plane is flying through air of standard density. In the event the plane is flying through air of less than standard density the impact of the air upon the Pitot static tube for a given air speed is less than would be the impact if the plane were flying through air of standard density, and consequently the indicated air speed as shown by the instrument upon the instrument panel is less than the true air speed of the plane. Inasmuch as the density of the air above the earth's surface decreases with an increase in altitude, it will be appreciated that the greater the altitude of the plane, for any given constant true air speed of the plane, the less will be the indicated air speed as shown by the air speed indicator upon the instrument panel. The rate of travel of the plane over the ground is, not considering wind conditions, equal to the true air speed of the plane, and is not equal to the indicated air speed.

Grounded aviation trainers conventionally include a simulated air speed indicator mounted upon the instrument panel in the trainer to indicate the assumed indicated air speed of the trainer, and these trainers also include a conventional recorder or flight simulating device which moves over a chart or the like to plot the assumed course of travel of the trainer over the earth's surface. For a disclosure of a trainer having a simulated air speed indicator to indicate the assumed indicated air speed of the trainer, reference may be made to United States Patent 2,099,857 dated November 23, 1937 and issued to Edwin A. Link, Jr., for Aviation Trainer, and for a disclosure of such a recorder or flight simulating device reference may be had to United States Patent 2,179,663 dated November 14, 1939 issued to Edwin A. Link, Jr. for Recorder.

It will be appreciated that in order to accurately simulate the performance of a real airplane in actual flight, it is necessary to provide apparatus which will cause the recorder or flight simulating device to move across the chart at a rate dependent upon the assumed true air speed of the trainer, at the same time causing the indications given by the simulated air speed indicator to be according to the assumed indicated air speed of the trainer. Inasmuch as in the case of a plane in actual flight the difference between the true air speed of the plane and the indicated air speed of the plane is primarily dependent upon the altitude of the plane, it follows that to provide apparatus for use in a grounded aviation trainer which will accurately simulate the corresponding real phases of a plane in actual flight, it is necessary to provide means whereby the rate of travel of the recorder over the chart differs from the indicated air speed as given by the air speed indicator in the trainer as a function of altitude.

As is well known, grounded aviation trainers of the type to which this invention relates comprise means for computing the assumed air speed which may be either assumed true air speed or assumed indicated air speed. When the computed air speed is assumed true air speed, the factor of assumed indicated air speed must be computed by combining the factors of assumed true air speed and assumed altitude. When the computed air speed is assumed indicated air speed, the factor of assumed true air speed must be computed by combining the factors of assumed indicated air speed and assumed altitude.

It is a principal object of this invention to provide a novel computing device for introducing the proper differential between the assumed indicated air speed as given by the air speed indicator upon the instrument panel and the rate of travel of the recorder.

It is a further object of this invention to provide a novel computing apparatus having as inputs the factors of assumed indicated air speed and assumed altitude, and having an output member positioned according to the assumed true air speed of the trainer, the position of the output member being usable to introduce the factor of assumed true air speed into any unit in the trainer requiring an input of assumed true air speed for proper operation.

It is still another object of this invention to provide a novel computing apparatus having as inputs the factors of assumed true air speed and assumed altitude, and having an output member positioned according to the assumed indicated air speed of the trainer, the position of the output member being used to introduce the factor of assumed indicated air speed into any unit of the trainer requiring an input of assumed indicated air speed for proper operation.

Other objects of my invention will become clear as the description proceeds.

For a detailed disclosure of the preferred embodiment of my invention, reference is made to the accompanying drawings wherein, Fig. 1 is a perspective view of the novel computer of this invention as arranged when indicated air speed is an input to the computer, and schematically showing the relation thereto of the simulated air speed indicator and simulated altimeter, as well as the wind drift instrument and recorder.

Fig. 2 is a detailed perspective view of a portion of the apparatus disclosed in Fig. 1.

Fig. 3 is a rectilinear graph showing the true air speed of a plane for various combinations of indicated air speed and altitude, and Fig. 4 discloses a graph of the functions disclosed in the graph of Fig. 3 replotted in curvilinear form, as well as a schematic representation of the computer disclosed in Figs. 1 and 2 superimposed on the graph.

Figure 4:
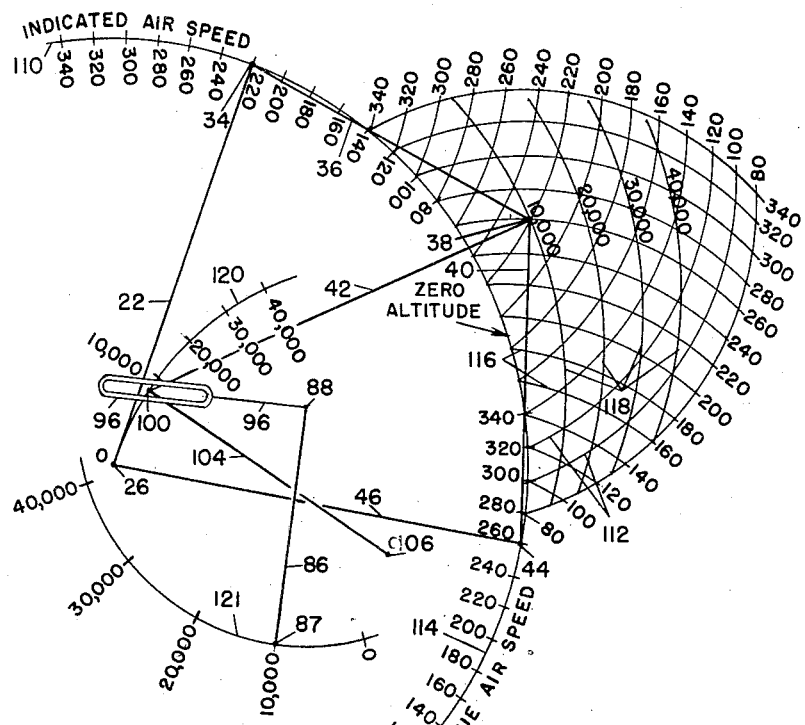

Reference is now made to Fig. 1 where the indicated air speed computer is shown in block form and designated 10. The construction of this computer may take any desired one of a wide variety of different forms, the detailed construction being immaterial to the functioning and operation of the apparatus of this invention. The indicated air speed computer 10 is connected through any suitable type of connection 12 to the simulated air speed indicator 14 upon the instrument panel of the trainer. Indicator 14 comprises a dial 16 graduated like the dial of the air speed indicator of a real plane, and a needle 18 which is mounted to move over the dial to indicate the assumed indicated air speed to the student receiving instruction in the trainer. The air speed indicator 14 operates in response to the operation of the indicated air speed computer 10 so that the indicator 14 indicates the assumed indicated air speed as computed by unit 10. The indicated air speed computer 10 has a second output which may take the form of the link 20, the outer end of which is pivotally connected to the arm 22 near the outer end thereof by means of stud 24. Link 20 is positioned by the indicated air speed computer 10 according to the instant assumed indicated air speed, link 20 moving to the left in Fig. 1 with an increase in assumed indicated air speed and to the right with a decrease in assumed indicated air speed. Consequently, the position of link 20 is at all times a measure of the factor of assumed indicated air speed. The lower end of arm 22 is freely mounted upon the horizontal shaft 26 which is carried by one end of the box-shaped casting 30 and by the web 28 integral with the casting 30. Casting 30 is affixed at any suitable point to the interior of the trainer fuselage. Web 28 carries the bearing 32 in which shaft 26 is rotatably mounted. The outer end of arm 22 carries the pivot 34 which also carries one end of link 36, link 36 being freely mounted upon the pivot 34 to permit pivoting thereof relative to the arm 22. The boss 37 is integral with the outer end of arm 22. The master pivot 38 holds the other end of link 36, the upper end of link 40 and the upper end of link 42 so that rotational movements of the three links 36, 40 and 42 relative to one another may take place. The lower end of link 40 carries the pivot 44 upon which the outer end of arm 46 is freely mounted, the inner end of arm 46 being affixed upon the shaft 26 by pin 47 to position the same according to the position of arm 46. Shaft 26 also carries the gear 48 which is affixed thereupon by pin 49, gear 48 in turn driving the gear 50 which in turn is affixed upon the shaft 52. Shaft 52 carries the pulley 54 to which is attached the cable 56 which forms the assumed true air speed input to the wind drift unit 58 which is shown in box form and is connected through the electrical conductor 60 to the recorder 62. For a disclosure of the wind drift unit 58 reference may be had to United States Patent 2,485,301 dated October 18, 1949 issued in the names of Gunne Lowkrantz and Karl A. Kail. As is well known to those skilled in the art, the unit 58 combines the four input factors of assumed wind speed, assumed wind direction, assumed true air speed and assumed trainer heading to compute the factors of assumed track and assumed ground speed. The recorder 62 is controlled by the latter two factors to move in a direction corresponding to the assumed track and at a rate dependent upon the assumed ground speed.

Still referring to Fig. 1, it will be seen that the altitude computer is designated by 74 and is shown in block form. This computer is connected by the connector 76 to the simulated altimeter designated generally by 78 which is preferably located upon the instrument panel near the air speed indicator 14. The simulated altimeter 78 includes the dial 80 graduated like the dial of the altimeter of a real plane, and the two indicating needles 82 which move over dial 80 to indicate to the student assumed altitude of the trainer. The detailed construction and operation of the altitude computer 74, connector 76 and simulated altimeter 78 are immaterial insofar as the apparatus of this invention is concerned, the only requirement being that the altitude computer 74 properly position the needles 82 relative to dial 80 according to the assumed altitude of the trainer. The altitude computer 74 also positions the output link 84 according to the instant assumed altitude of the trainer, link 84 being moved to the left in Fig. 1 in response to an increase in assumed altitude and to the right in response to a decrease in assumed altitude. Consequently, the position of link 84 may be taken as a measure of the instant assumed altitude of the trainer.

The outer end of link 84 is pivotally connected to the lower end of arm 86 by means of pivot 87, the upper end of arm 86 being affixed upon the shaft 88 by means of set screw 90. Shaft 88 is rotatably carried by the end 92 of the casting 30, the boss 94 being integral with the end 92 to displace the arm 86 somewhat from the end 92. The inner end of shaft 88 carries one end of the arm 96 which is slotted at 98, as also shown in Fig. 2, to which reference is also made.

One end of the stud 100 is positioned in slot 98 for movement therealong, stud 100 also carrying the outer end of arm 104 and the lower end of the previously mentioned link 42. Boss 102 is integral with the end of arm 104. The end of link 42 and arm 104 carried by stud 100 are freely pivoted relatively to one another, and the other end of arm 104 is pivoted upon the fixed stud 106 carried by the end 92 of casting 30 and displaced somewhat thereform by the boss 108 integral with end 92.

Reference is now made to Fig. 3 which is a rectilinear graph showing the relationship between the indicated air speed and true air speed of a plane in actual flight at various selected altitudes and to Fig. 4 which is a curvilinear graph of the functions shown in Fig. 3 replotted in curvilinear form. Superimposed upon the graph of Fig. 4 is a schematic representation of the linkages and pivots of the computer shown in Fig. 1, the various pivots, arms and linkages being designated in Fig. 4 by the same reference characters as in Fig. 1.

The graphical basis and method of design of the true air speed computer shown in Fig. 1 will now be described with reference to Fig. 4.

The location of fixed pivot 26 was arbitrarily selected, and a suitable length chosen for the arms 22 and 46, these arms being made equal in length in the illustrated case, although they need not necessarily be of equal length.

Employing the point 26 as a center and using a radius equal to the length of arm 22, the indicated air speed arc 110 was drawn. The arc 110 was divided into suitable increments of equal length, and the dividing points upon this arc were numbered from 80 to 340 in increments of 20 knots of indicated air speed. Employing a radius equal to the desired length of link 36, and using the various division marks upon arc 110 as centers, the indicated air speed arcs 112 were drawn, and each of these arcs was given the same number as the point along arc 110 serving as its center.

Then, employing the point 26 as a center and using a radius equal to the length of arm 46, the true air speed arc 114 was drawn. This arc was then divided into suitable increments of equal length, the dividing points along this arc being numbered from 80 to 340 in increments of 20 knots of true air speed, the increments along arc 114 being equal in length to the increments along arc 110. Using the various dividing points along arc 114 as centers, and employing a radius equal to the desired length of link 40, the true air speed arcs 116 were drawn, these arcs being given a number equal to the number assigned to the point along arc 114 serving as its center. In the illustrated case, links 36 and 40 are of equal length, but such need not necessarily be the case.

By reference to the graph of Fig. 3, the various true air speeds produced for various indicated air speeds at altitudes of 10,000 feet, 20,000 feet, 30,000 feet and 40,000 feet were ascertained and then plotted relative to the curves 112 and 116 of Fig. 4. It was found that the 10,000 feet points, the 20,000 feet points, the 30,000 feet points and the 40,000 feet points approximately defined the four altitude curves 118 of equal radius and which were then drawn in relative to the curves 112 and 116. Each of the curves 118 was properly numbered according to the altitude it represented. The location of the center of each of the curves 118 was then plotted, and it was found that the plotted centers defined the arc 120, and the location of the center of this arc was selected as the location of the fixed pivot 106. The center of each of the curves 118 falling on arc 120 was numbered according to the altitude value of the curve 118 of which it is the center.

The length of link 104 was selected as equal to the radius of arc 120 and the length of link 42 was selected to be equal to the radius of the various altitude curves 118. Also, the length of link 42 was selected as being equal to the length of links 22 and 46, and to accomplish this result the positions of the curves 118 were slightly modified. It was noted that the zero, 10,000 feet, 20,000 feet, 30,000 feet and 40,000 feet points along the arc 120 were non-linearly spaced, and consequently the position of the fixed pivot 88 was displaced from the center of arc 120 so that for a given angular movement of the slotted arm 96 about the fixed pivot 88, the pin 100 would be moved non-linearly along the arc 120 according to the non-linear spacing of the various altitude points along arc 120. Consequently, when the arm 96 is moved through an angle equal to a given change is assumed altitude, e. g., 10,000 feet, the pin 100 has its position changed relative to the selected points along arc 120 by an amount equal to 10,000 feet according to the values of the points on arc 120. The desired length of arm 86 was then selected, and the arc 121 was drawn using the location of the fixed pivot 88 as a center and the length of arm 86 as a radius. By successively placing the arm 96 in the zero, 10,000, 20,000, 30,000 and 40,000 feet positions along arc 120, the position of pivot 87 along arc 121 for the corresponding values was ascertained, and the points so determined along arc 121 were given corresponding values of assumed altitude. It will be noted that the values along arc 121 are linearly spaced.

The output link 84 of the altitude computer 74 of Fig. 1 is arranged so that for assumed altitude of 0, 10,000, 20,000, 30,000 and 40,000 feet the pivot 87 is above the corresponding valued point along the arc 121. At the same time, the link 20 of Fig. 1 is arranged so that for assumed indicated air speeds of 80, 100, 120, etc., to 340 miles per hour, the pivot point 34 is respectively above the 80, 100, 120, etc. points along arc 110.

Comparison of the graphs of Figs. 3 and 4 show that given indicated air speeds and altitudes produce approximately equal true air speeds. For example, in Fig. 3 an indicated air speed of 220 knots and an altitude of 10,000 feet give a true air speed of close to 257 knots, while in Fig. 4 the same indicated air speed and altitude give a true air speed of close to the same amount.

By virtue of the previously described method of design of the computer of this invention, it will be appreciated that the pivot 34 in Fig. 4 is always positioned along the arc 110 according to the instant assumed indicated air speed of the trainer. Consequently, the master pivot 38 is always positioned relative to the indicated air speed curves 112 according to the assumed indicated air speed. In the case illustrated in Fig. 4, the position of the pivot 34 and of the master pivot 38 is illustrated for an indicated assumed air speed of 220 miles per hour, and it will be noted that the master pivot 38 is directly above the 220 miles per hour indicated air speed curve 112.

At the same time, the pivot 87 is always positioned along the arc 121 according to the instant assumed altitude of the trainer, and the arm 96 is similarly always positioned about the fixed pivot 88. Consequently, the pin 100 will always be positioned along the arc 120 according to the instant assumed altitude of the trainer, and by virtue of link 42, the master pivot 38 will always be positioned relative to the altitude curves 118 according to the instant assumed altitude of the trainer. In the illustrated case, the position of the pivot 87, arm 86, arm 96, pin 100, link 42, and master pivot 38 are positioned for an assumed altitude of 10,000 feet. When assumed altitude is zero, the axis of pin 100 coincides with the axis of pivot 26 and master pivot 38 is displaced from the fixed pivot 26 by the same distance as arcs 110 and 114. Under these circumstances true air speed equals indicated air speed. The adjacent ends of these two arcs therefore define the zero altitude arc.

Consequently, the master pivot 38 is always positioned relative to the altitude curves 118 and indicated air speed curves 112 according to the instant assumed altitude and instant assumed indicated air speed of the trainer. By virtue of the fact that the indicated air speed curves 112 and altitude curves 118 are plotted relative to the true air speed curves 116 to indicate the true air speed for any combination of indicated assumed air speed and assumed altitude, it will be appreciated that the master pivot 38 is at all times positioned relative to the true air speed curves 116 to indicate the assumed true air speed for the instant assumed indicated air speed and instant assumed altitude. Consequently, by means of link 40 the pivot 44 is always positioned along the true air speed arc 114 according to the instant assumed true air speed, and the arm 46 is correspondingly positioned about the axis of shaft 26, positioning this shaft rotationally according to the instant assumed true air speed. Referring to Fig. 1, the gear 48, gear 50, shaft 52 and pulley 54 will all always be positioned according to the instant assumed true air speed of the trainer, and the pulley 54 will position the cables 56 according to the same factor. The cable 56 introduces the proper value for instant assumed true air speed into the wind drift unit 58, and by means of the cable 60 the wind drift unit causes the recorder 62 to have its rate of travel over the conventionally used chart varied according to the instant assumed true air speed.

It will be appreciated that the position of shaft 26 may be taken as a measure of the assumed true air speed of the trainer, and consequently may be used to introduce the factor of assumed true air speed into any unit in the trainer requiring such an input. Such a unit could be the simulated artificial horizon, such as disclosed in United States Patent 2,485,293 dated October 18, 1949 and issued in the name of Karl A. Kail.

Figure 5:
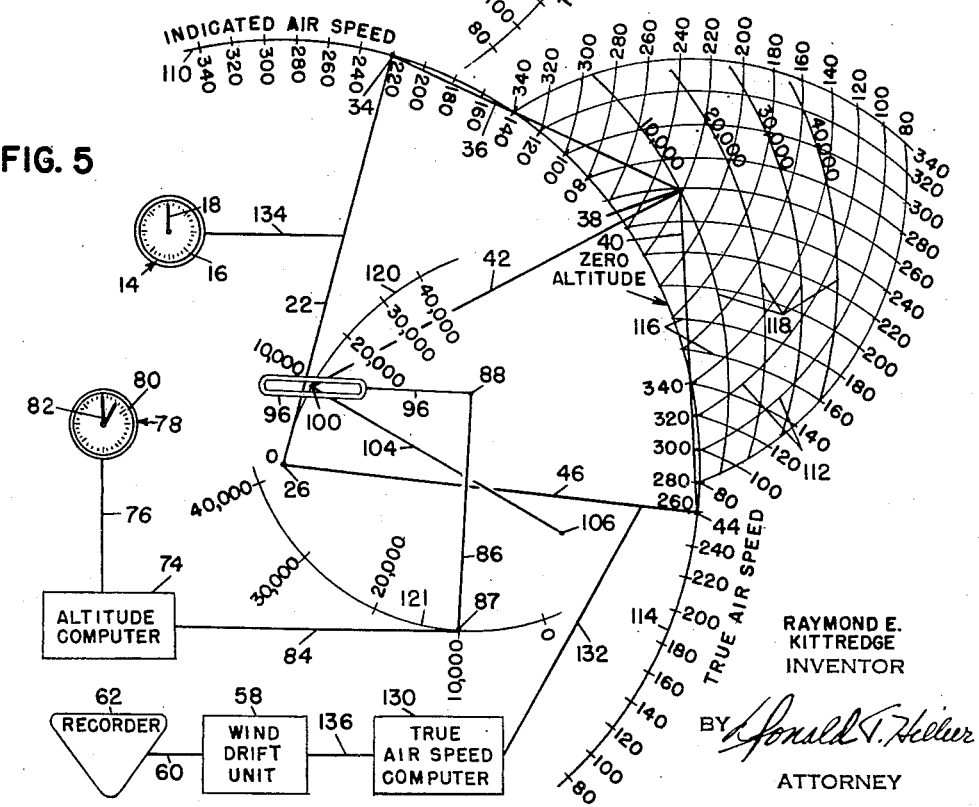
Fig. 5 shows a graph of the functions disclosed in Fig. 3 replotted in curvilinear form, as well as a schematic representation of a computer having as its inputs the factors of assumed true air speed and altitude, and an output of assumed indicated air speed.

Reference is now made to Fig. 5 which shows the embodiment of my invention for computing the factor of assumed indicated air speed according to the value of the assumed true air speed and assumed altitude. The apparatus in this case is identical with the previously disclosed embodiment of my invention with the exception that the true air speed computer 130 positions the output link 132 according to the value of the instant assumed true air speed and so that the pivot 44 is positioned along arc 114 according to the instant assumed true air speed. Consequently, the master pivot 38 is positioned relative to the true air speed arcs 116 according to the instant assumed true air speed. The altitude input remains unchanged, and so the master pivot 38 is positioned relative to the altitude curves 118 according to the instant assumed altitude. As a result of the positioning of the master pivot 38 relative to the curves 116 and 118 according to the instant assumed true air speed and instant assumed altitude, it follows that the master pivot 38 is also positioned relative to the indicated air speed curves 112 according to the instant assumed indicated air speed. Consequently, the position of pivot 34 along arc 110 and the position of arm 22 about pivot 26 is according to the instant assumed indicated air speed, and the arm 22 may be connected to the simulated air speed indicator 14 through the schematically shown connection 134 to cause the indicator 14 to indicate an assumed indicated air speed according to the position of arm 22.

The true air speed computer 130 is connected through the connector 136 to the wind drift unit 58 to introduce the factor of assumed true air speed into the same, and the wind drift unit 58 is connected by connector 60 to the recorder 62, as in the previously disclosed embodiment.

In view of the preceding disclosure, it will be appreciated that the apparatus of this invention provides a novel computer for computing the factor of assumed true air speed for any combination of assumed indicated air speed and assumed altitude, and also a novel computer for computing the factor of assumed indicated air speed for any combination of assumed true air speed and assumed altitude. This application also illustrates the use of the computer for introducing the proper differential between the rate of travel of the recorder and the indication given by the simulated air speed indicator in the trainer for the prevailing assumed indicated air speed and assumed altitude, or for the prevailing assumed true air speed and assumed altitude.

It will be appreciated by those skilled in the art that many changes may be made from the preferred disclosed embodiment of my invention without departing from the substance thereof. Also, the factors of assumed true air speed and assumed indicated air speed as computed by the apparatus of this invention may be employed as an input into other units than those disclosed herein. All such changes and all such uses are intended to be covered by the following claims.

I claim:

1. A computer for use in grounded aviation trainers for modifying a selected air speed factor according to the value of assumed altitude, said computer comprising a first fixed pivot, a pair of arms each having a first end pivotally held at said fixed pivot, a pair of links each having a first end pivoted to the second end of a different one of said pair of arms, the second end of each of said pair of links being pivotally held together by a master pivot, a second fixed pivot and a third arm pivoted thereupon, a third fixed pivot displaced from the axis of said second fixed pivot and a fourth arm pivoted thereupon, a third link having one end pivotally connected to said master pivot and its other end connected to the outer end of said third arm by a pivot, a sliding connection between said fourth arm and said last mentioned pivot, means for positioning one of said first pair of arms about said first fixed pivot according to the selected air speed factor, and means for positioning said fourth arm about said third fixed pivot according to the factor of instant assumed altitude, whereupon said master pivot and the other of said first pair of arms are positioned according to the instant assumed air speed factor and altitude.

2. The apparatus of claim 1 in which the selected air speed factor is assumed indicated air speed and the modifying thereof by assumed altitude produces the factor of assumed true air speed.

3. The apparatus of claim 1 in which the selected air speed factor is assumed true air speed and the modifying thereof by assumed altitude produces the factor of assumed indicated air speed.

RAYMOND E. KITTREDGE.

REFERENCES CITED

The following references are of record in the file of this patent:

UNITED STATES PATENTS

| Number | Name | Date |
|---|---|---|
| 2,093,254 | Spitzglass et al. | Sept. 14, 1937 |
| 2,096,032 | Engel | Oct. 19, 1937 |
| 2,328,306 | Svoboda | Aug. 31, 1943 |
| 2,459,726 | Svoboda | Jan. 18, 1949 |

FOREIGN PATENTS

| Number | Country | Date |
|---|---|---|
| 113,136 | Great Britain | Feb. 7, 1918 |
| 144,893 | Switzerland | May 16, 1931 |